US006520859B2

(12) United States Patent
Beitzel et al.

(10) Patent No.: US 6,520,859 B2
(45) Date of Patent: Feb. 18, 2003

(54) UNIVERSAL JOINT BEARING INSERT FORMED FROM CERAMIC OR COMPOSITE MATERIALS

(75) Inventors: Daniel E. Beitzel, Perrysburg, OH (US); Scott A. Dunn, Toledo, OH (US)

(73) Assignee: Spicer Driveshaft, Inc., Holland, OH (US)

( * ) Notice: Subject to any disclaimer, the term of this patent is extended or adjusted under 35 U.S.C. 154(b) by 0 days.

(21) Appl. No.: 09/749,251

(22) Filed: Dec. 27, 2000

(65) Prior Publication Data

US 2002/0082092 A1 Jun. 27, 2002

(51) Int. Cl.⁷ .................................. F16D 3/40
(52) U.S. Cl. ................. 464/132; 464/903; 29/DIG. 29; 384/297
(58) Field of Search ................. 464/128, 132, 464/903; 384/282, 283, 297, 299, 300, 907.1, 908, 910; 29/DIG. 29

(56) References Cited

U.S. PATENT DOCUMENTS

| | | | | |
|---|---|---|---|---|
| 2,952,144 A | * | 9/1960 | Holmes, Jr. ................. | 464/132 |
| 3,087,314 A | * | 4/1963 | Jarvis et al. ............. | 464/132 X |
| 3,241,336 A | * | 3/1966 | Nemtsov ................. | 384/297 X |
| 3,677,032 A | | 7/1972 | Suzuki | |
| 3,782,797 A | * | 1/1974 | Lange et al. ................. | 384/297 |
| 4,758,202 A | | 7/1988 | Maciag et al. | |
| 4,774,749 A | * | 10/1988 | Furumura ............... | 384/297 X |
| 4,967,705 A | | 11/1990 | Maciag et al. | |
| 5,728,004 A | * | 3/1998 | Dziegielewski ......... | 384/300 X |
| 5,848,348 A | | 12/1998 | Dennis | |
| 5,917,402 A | * | 6/1999 | Ebata | |
| 6,042,271 A | * | 3/2000 | Harris et al. ................. | 384/299 |
| 6,105,969 A | * | 8/2000 | Anderton et al. .... | 384/907.1 X |

FOREIGN PATENT DOCUMENTS

| | | | | |
|---|---|---|---|---|
| CH | 346735 | * | 7/1960 | ................. 384/297 |
| DE | 1 055 892 | * | 4/1959 | ................. 384/908 |
| DE | 207181 | * | 1/1960 | ................. 384/908 |
| GB | 732999 | | 7/1955 | |
| GB | 2265688 | | 10/1993 | |

OTHER PUBLICATIONS

The Bearings Book, 1961 ed., Penton Publishing, Cleveland, pp. 102 & 103, Apr. 1961.*
Universal Joint and Driveshaft Design Manual, Advances in Engineering Series No. 7, The Society of Automotive Engineers, Inc., Warrendale PA, pp. 66, 71 & 138, TJ1079.S62 1979.*

* cited by examiner

Primary Examiner—Greg Binda
(74) Attorney, Agent, or Firm—MacMillan, Sobanski & Todd, LLC

(57) ABSTRACT

A universal joint includes a cross member having a plurality of trunnions extending outwardly therefrom. A hollow bearing cup is disposed about the end of each of the trunnions. Each of the bearing cups has an open end, a closed end, and an inner surface that is disposed about a bearing surface formed on the trunnion. An insert is disposed between the bearing surface of the trunnion and the inner surface of the bearing cup provided thereon. In a first embodiment, an annular groove is formed in the inner surface of the bearing cup that receives the insert therein. In a second embodiment, the insert is disposed between the cylindrical bearing surface of the trunnion and the cylindrical inner surface of the bearing cup. The insert is formed from either a ceramic material or a composite material. The bearing cup may be formed from a metallic material that is molded about the insert.

21 Claims, 4 Drawing Sheets

UNIVERSAL JOINT BEARING INSERT FORMED FROM CERAMIC OR COMPOSITE MATERIALS

BACKGROUND OF THE INVENTION

This invention relates in general to universal joint assemblies for use in vehicular drive train and steering systems. In particular, this invention relates to a universal joint assembly including a cross having at least one trunnion that rotatably supports a bearing cup on the end thereof, wherein a bearing insert formed from a ceramic or composite material is disposed between the trunnion and the bearing cup.

Universal joints are well known devices that provide a driving connection between two members adapted to rotate about non-aligned axes of rotation. Universal joints are widely used, for example, to connect rotatable members in vehicle drive train systems and in vehicle steering shaft systems. In a typical drive train system, a first universal joint is connected between an output shaft of an engine/transmission assembly and a first end of a driveshaft tube, while a second universal joint is connected between a second end of the driveshaft tube and an input shaft of an axle assembly. The universal joints provide a rotational driving connection from the output shaft of the engine/transmission assembly through the driveshaft tube to the input shaft of the axle assembly, while accommodating a limited amount of angular misalignment between the rotational axes of these three shafts.

A typical structure for a universal joint includes a cross having a central body portion with four cylindrical trunnions extending outwardly therefrom. The trunnions are oriented in a single plane and extend at right angles relative to one another. A hollow cylindrical bearing cup is mounted on the end of each of the trunnions. Needle bearings or similar means are provided between the outer cylindrical surfaces of the trunnions and the inner cylindrical surfaces of the bearing cups to permit relative rotational movement between the trunnions and the bearing cups. The bearing cups mounted on a first opposed pair of the trunnions are connected to a first yoke that, in turn, is secured to one of the rotatable components of the vehicle drive train system. Similarly, the bearing cups mounted on a second opposed pair of the trunnions are connected to a second yoke that, in turn, is secured to a second one of the rotatable components of the vehicle drive train system.

One problem that is associated with the use of traditional universal joints is friction. Friction occurs between the trunnions of the cross and the bearing cups mounted thereon when the such components move relative to one another as the universal joint is rotated at an angle during use. The amount of such relative movement is dependent upon the speed of such rotation and the magnitude of the angular misalignment between the two shafts that are connected together by the universal joint. As mentioned above, a plurality of needle bearings or other bearing structures have traditionally provided between the trunnion of the cross and the associated bearing cup to reduce the amount of friction therebetween and, therefore, the amount of heat and wear that occurs as a result of such friction. As a precaution in dealing with the heat generated by the rapid rotation of the universal joint, it is known to subject portions of some or all of the trunnions, the roller bearings, and the bearing cups to a heat treating process for greater hardness to withstand the rigors of high temperature operation caused by friction. Additionally, lubricant is often provided in the region of the needle bearings between the bearing cups and the trunnions in the universal joint to reduce the amount of friction generated during use.

Although known universal joints have functioned satisfactorily, it would be desirable to provide an improved structure for a universal joint that contains components that generate less friction during operation than is produced by conventional universal joints and that are more capable of handling the heat that is generated during use. It would also be desirable to provide such an improved universal joint that contains a lesser number of parts and, therefore, is lower in cost to manufacture and assemble than typical universal joints.

SUMMARY OF THE INVENTION

This invention relates to a universal joint including a cross member having a plurality of trunnions extending outwardly therefrom. A hollow bearing cup is disposed about the end of each of the trunnions. Each of the bearing cups has an open end, a closed end, and an inner surface that is disposed about a bearing surface formed on the trunnion. An insert is disposed between the bearing surface of the trunnion and the inner surface of the bearing cup provided thereon. In a first embodiment, an annular groove is formed in the inner surface of the bearing cup that receives the insert therein. In a second embodiment, the insert is disposed between the cylindrical bearing surface of the trunnion and the cylindrical inner surface of the bearing cup. The insert is formed from either a ceramic material or a composite material. The bearing cup may be formed from a metallic material that is molded about the insert.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
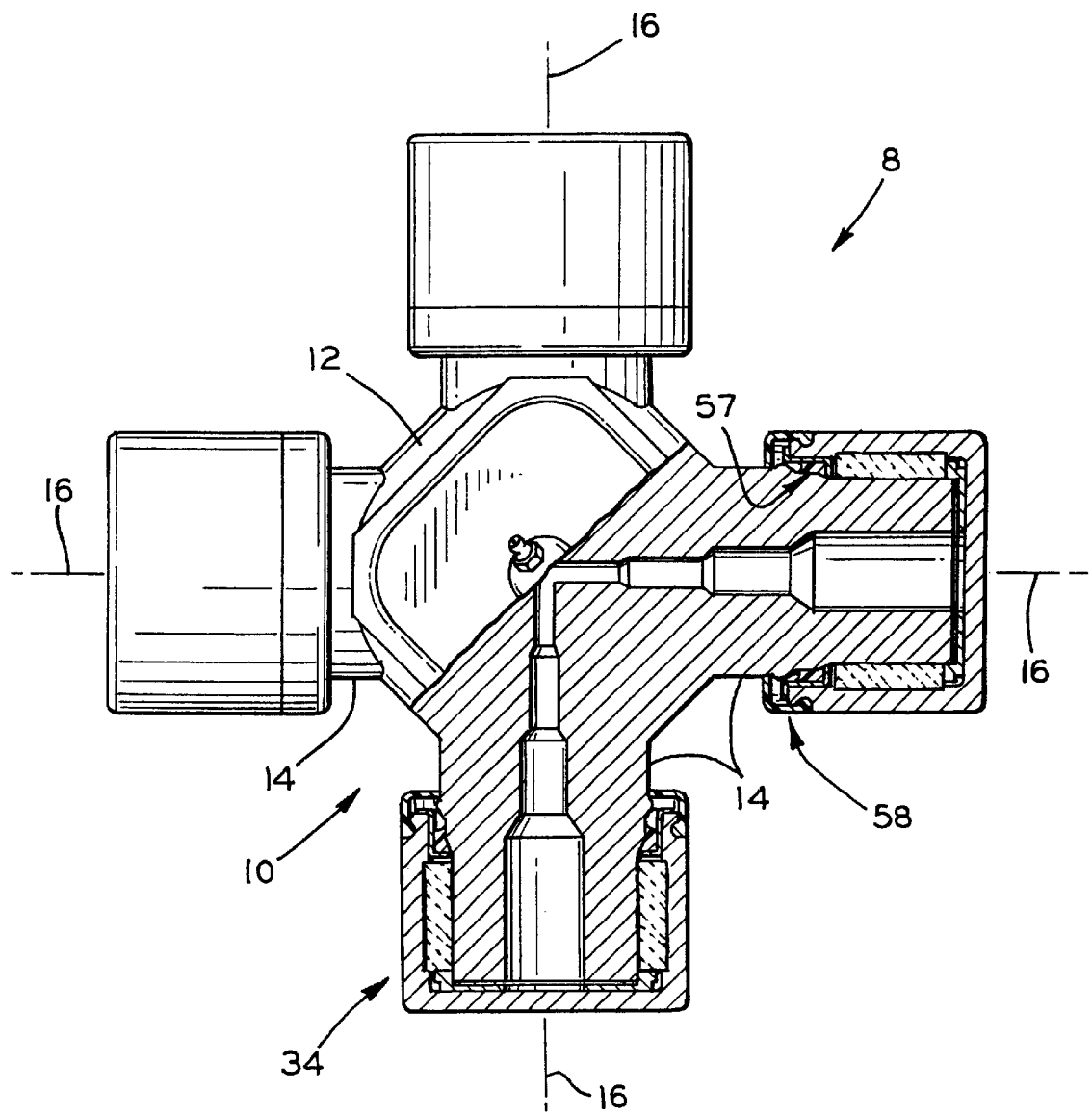
FIG. 1 is a side elevational view, partially in cross section, of a first embodiment of a cross assembly for a universal joint in accordance with this invention.

Referring now to the drawings, there is illustrated in FIG. 1 a first embodiment of a cross assembly, indicated generally at 8, for a universal joint in accordance with this invention. The cross assembly 8 includes a cross, indicated generally at 10, having a central body portion 12. A plurality of trunnions 14 extend outwardly from the body portion 12. In the illustrated embodiment, four of such trunnions 14 are formed integrally with the body portion 12. The trunnions 14 are disposed at right angles relative to one another and are oriented so as to lie in a single plane. The trunnions 14 are generally hollow and cylindrical in shape and extend outwardly from the central body portion 12 along respective longitudinal axes 16.

Figure 2:
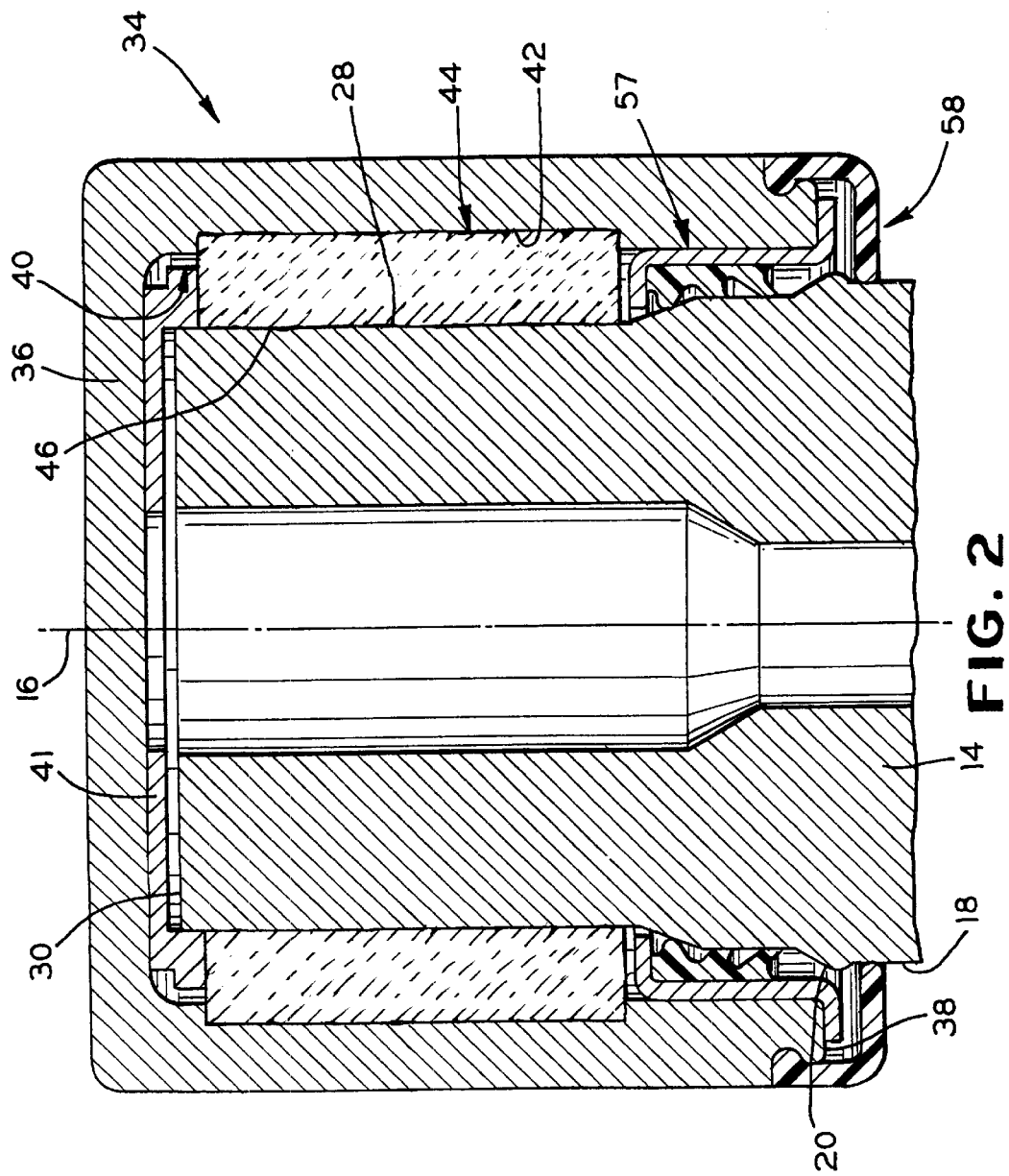
FIG. 2 is an enlarged sectional elevational view of one of the trunnions and bearing cups of the cross illustrated in FIG. 1.

As best shown in FIG. 2, each of the trunnions 14 includes a cylindrical outer friction surface 18 on the axially inner end thereof. An annular ridge 20 may be formed in the friction surface 18 at or near the axially outer end of the friction surface 18, although such is not required. The trunnion 14 also includes a cylindrical bearing surface 28 that extends axially outwardly from the annular ridge 20. The bearing surface 28 terminates at an axially outer end surface 30 of the trunnion 14. A bearing cup, indicated generally at 34, is mounted on the end of each of the trunnions 14 of the cross 10. Each of the bearing cups 34 is generally hollow and cylindrical in shape, including a closed end 36, an open end 38, and an inner bearing surface, indicated generally at 40.

An annular thrust washer 41 is provided between the axially outer end surface 30 of the trunnion 14 and the inner surface of the closed end 36 of the bearing cup 34. The thrust washer 41 is conventional in the art and is provided to reduce the amount of friction between the end of the trunnion 14 and the associated bearing cup 34 when relative rotation occurs. The thrust washer 41 enables the bearing cup 34 to fit tightly on the trunnion 14 to prevent the bearing cup 34 from moving axially relative to the trunnion 14 and the remainder of the cross 10 during operation, thereby reducing the amount of undesirable noise and vibration.

Figure 3:
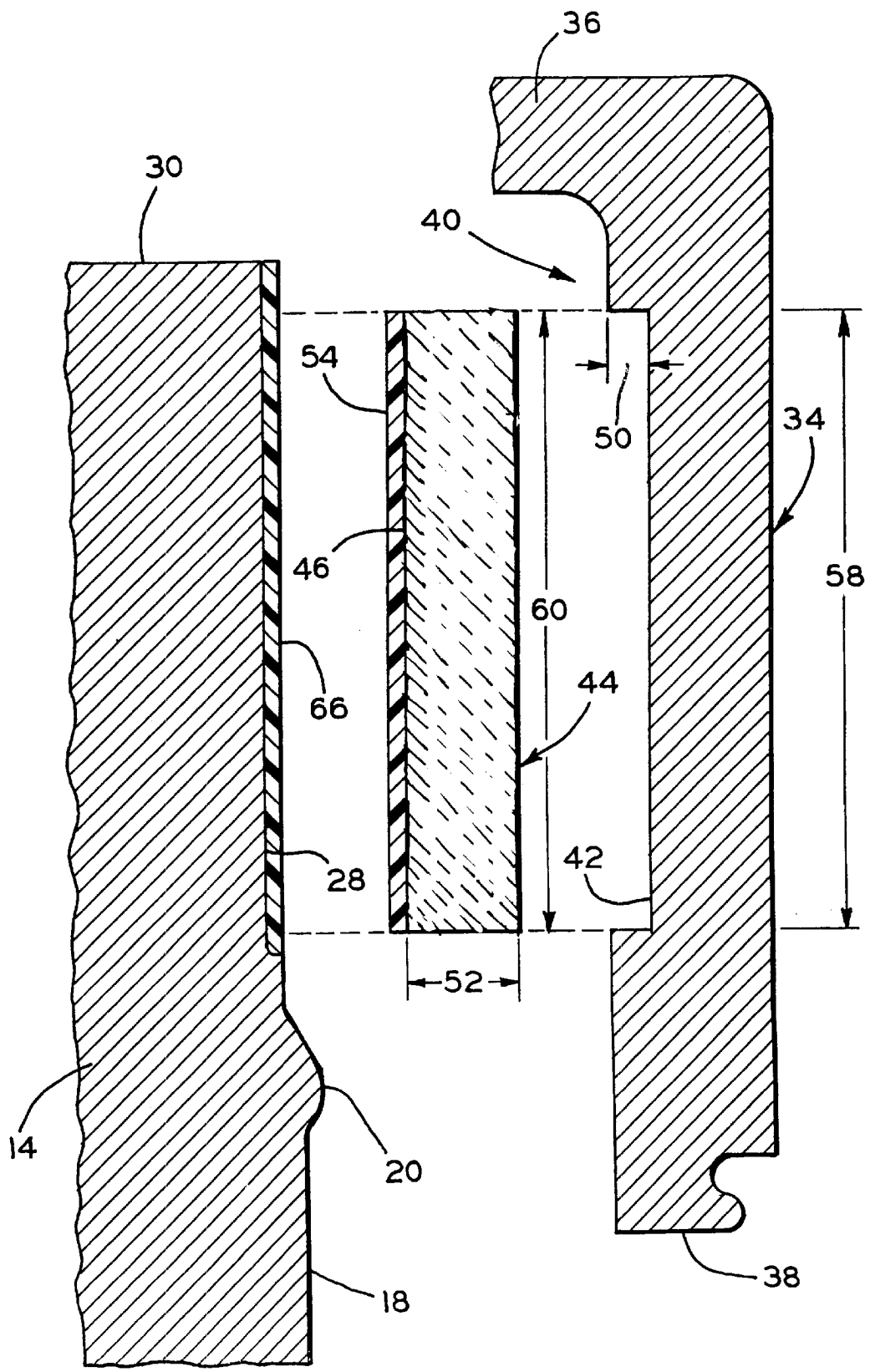
FIG. 3 is a further enlarged exploded sectional elevational view of a portion of the trunnion, the ceramic insert, and the bearing cup illustrated in FIG. 2.

The inner bearing surface 40 of the bearing cup 34 may be formed having an annular recess 42 that receives an annular insert or bushing, indicated generally at 44. As best shown in FIGS. 2 and 3, the insert 44 is sized to fit between the outer bearing surface 28 of the trunnion 14 and the inner surface 40 of the bearing 34, for a purpose that will be described in further detail below. Thus, when the bearing cup 34 is mounted about the trunnion 14, the closed end 36 of the bearing cup 34 is disposed adjacent to the axially outer end surface 30 of the trunnion 14, while the insert 44 and the inner bearing surface 40 of the bearing cup 34 are disposed concentrically about the outer bearing surface 28 of the trunnion 14.

As best shown in FIG. 3, the annular recess 42 in the inner surface 40 of the bearing cup 34 has a radial depth indicated at 50. The magnitude of this radial depth 50 can be selected as desired to receive a portion of the insert 44 therein. The radial depth 50 of the recess 42 is preferably not so large as to unduly weaken the bearing cup 34, but preferably is of sufficient depth to affirmatively retain the insert 44 therein. The insert 44 itself has a radial depth indicated at 52. The radial depth 52 of the insert 44 can be of any magnitude that is suitable for operation within the cross assembly 8. It has been found desirable, however, for the radial depth 52 of the insert 44 to be somewhat greater than the radial depth 50 of the recess 42. As a result, an inner surface 46 of the insert 44 protrudes radially inwardly from the inner surface 40 of the bearing cup 34. As will be described in further detail below, the inner surface 46 of the insert 44 functions as a bearing surface to support the bearing cup 34 for rotation relative to the trunnion 14. The recess 42 further has an axial length indicated at 58. Similarly, the insert 44 has an axial length indicated at 60. The axial length 60 of the insert 44 is preferably slightly larger than the axial length 58 of the recess 42 such that the insert 44 is received within the recess 42 in a press fit relationship.

The annular recess 42 can be formed in the bearing cup 34 in any of several methods. The recess 42 can be formed by a milling process that removes material from the inner surface 40 of the bearing cup 34. Alternatively, the annular recess 42 can be formed into the bearing cup 34 by a forging operation or a molding operation when the bearing cup 34 is formed. In one such molding method, the metal is prepared in the form of a powdered metal material. The powdered metal material is molded into the desired shape of the bearing cup 34, using a mold to form the shape of the bearing cup. After molding, the molded powdered metallic material is heat treated to form the bearing cup as a finished product. The powdered metallic material can be introduced into the mold by an injection molding process, or by any other method. One of the advantages of using a molding process for forming the metallic bearing cup 34 is that the insert 44 can first be formed, and then the metallic material can be molded thereabout. This ensures a good fit between the insert 44 and the metallic bearing cup 34, and further ensures a strong bond between the insert 44 and the bearing cup 34.

The insert 44 is preferably formed from a ceramic material. Ceramic materials can be broadly defined as inorganic, nonmetallic materials that exhibit such useful properties as high strength and hardness, high melting temperatures, chemical inertness, and low thermal and electrical conductivity, but that also display brittleness and sensitivity to flaws. Traditional ceramic products are formed from common, naturally occurring minerals, such as clay and sand. Industrial ceramics are commonly understood to be all industrially used materials that are inorganic, nonmetallic solids. Usually they are metal oxides (that is, compounds of metallic elements and oxygen), but many ceramics (especially advanced ceramics) are compounds of metallic elements and carbon, nitrogen, or sulfur. In atomic structure, they are most often crystalline, although they also may contain a combination of glassy and crystalline phases. These structures and chemical ingredients, though various, result in universally recognized ceramic-like properties of enduring utility, including the following: mechanical strength in spite of brittleness; chemical durability against the deteriorating effects of oxygen, water, acids, bases, salts, and organic solvents; hardness, contributing to resistance against wear; thermal and electrical conductivity considerably lower than that of metals; and an ability to take a decorative finish. In this instance, the insert 44 may be formed from any ceramic material that is suited to withstand the relatively high temperatures and stresses to which the insert 44 may be subjected to during use in the cross assembly 8. The insert 44 can be formed by casting the raw material to form the desired shape, then firing the cast material at a high temperature for fusion and/or reaction of the components to produce an insert 44 having very high operational temperature capability.

Alternatively, the insert 44 can be formed from a composite material. Composite materials can be broadly defined as any solid material that results when two or more different substances, each with its own characteristics, are combined to create a new substance whose properties are superior to those of the original components in a specific application. Composites are achieved by embedding fibers of one substance in a host matrix of another. Typically, the matrix that acts as an adhesive, binding the fibers together and lending solidity to the material. The rigid fibers impart structural strength to the composite, while the matrix protects the fibers from environmental stress and physical damage and imparts thermal stability to them. For example, the insert may be formed from a high temperature polymeric material. Preferably, a material having a low coefficient of friction is selected so that the friction between the insert 44 and the trunnion 14 is minimized. An example of a composite material that could be used to form the insert 44 is semi-crystalline thermoplastic polyester based on polyethylene terephthalate (PET-P), sold under the brand names Ertalyte and Ertalyte TX (PET-P with a solid lubricant). Another example is Nylon 6/6, with can be filled with various percentages of glass reinforcements or polymer reinforcements. Acetyl and polytetrafluoroethylene can also be used, particularly as sold under the brand name Fulton 404. A glass filled lubricated bearing grade polyphthalamide (PPA) can also be used. This is sold under the brand name Lubricomp BGU by LNP Engineering Plastics. Also, the composite material can be a thermoplastic polyester filled with various percentages of glass fibers and/or polytetrafluoroethylene fibers. When the insert 44 is formed from a composite material, the insert 44 is preferably press fit into the recess 42 in the bearing cup 34. Alternatively, the insert 44 can be molded into the recess 42.

If desired, the inner surface 46 of the insert 44 may be coated or otherwise provided with a layer 54 of a wear-resistant material. Such a layer 54 may be provided to prolong the useful lifespan of the insert 44 by reducing the coefficient of friction associated with the contact between the inner surface 46 of the insert 44 and the outer bearing surface 28 of the trunnion 14. The layer 54 of the wear-resistant material may be formed having any desired radial depth or thickness. The layer 54 of the wear-resistant material may be composed of any material that is suitable for protecting the insert 44 and for reducing the friction associated with relative rotation between the insert 44 and the trunnion 14. A preferred material for the layer 54 of the wear-resistant material is polytetrafluoroethylene. Alternatively, or additionally, the outer bearing surface 28 of the trunnion 14 can also be provided with a similar layer 66 of a wear-resistant material to protect the trunnion surface 28 from wear and to reduce friction.

An annular seal assembly, indicated generally at 57 in FIGS. 1 and 2, may be provided about the open end 38 of each of the bearing cups 34 to prevent moisture and dirt from reaching the internal portion of the cross assembly 8. The annular seal assembly 57 is conventional in the art and includes a metallic support ring having an elastomeric seal secured thereto. A dust guard, indicated generally at 58 in FIGS. 1 and 2, may also be provided about the open end 38 of each of the bearing cups 34 to protectively cover the annular seal assembly 57. The dust guard 58 is conventional in the art and includes an inwardly extending portion that is received within an annular groove formed on the outer surface of the bearing cup 34 to secure it thereto.

The ceramic or composite insert 44 of this invention eliminates the need for the use of a plurality of conventional needle or roller bearings, as described above. As a result, the process of assembling the bearing cup 34 onto the trunnion 14 is greatly simplified. Furthermore, because it is usually necessary to heat treat such conventional needle or roller bearings, the time and expense of this process is avoided. Also, the reduced amount of friction provided by the insert 44 rotating with respect to the trunnion 14 may also enable the bearing cup 34 itself to be made without a costly hardening heat treatment process, thereby further reducing costs. It is contemplated that the use of the ceramic or composite insert 44 of this invention may reduce the amount of lubrication that would otherwise be required during operation of the cross assembly 8.

Figure 4:
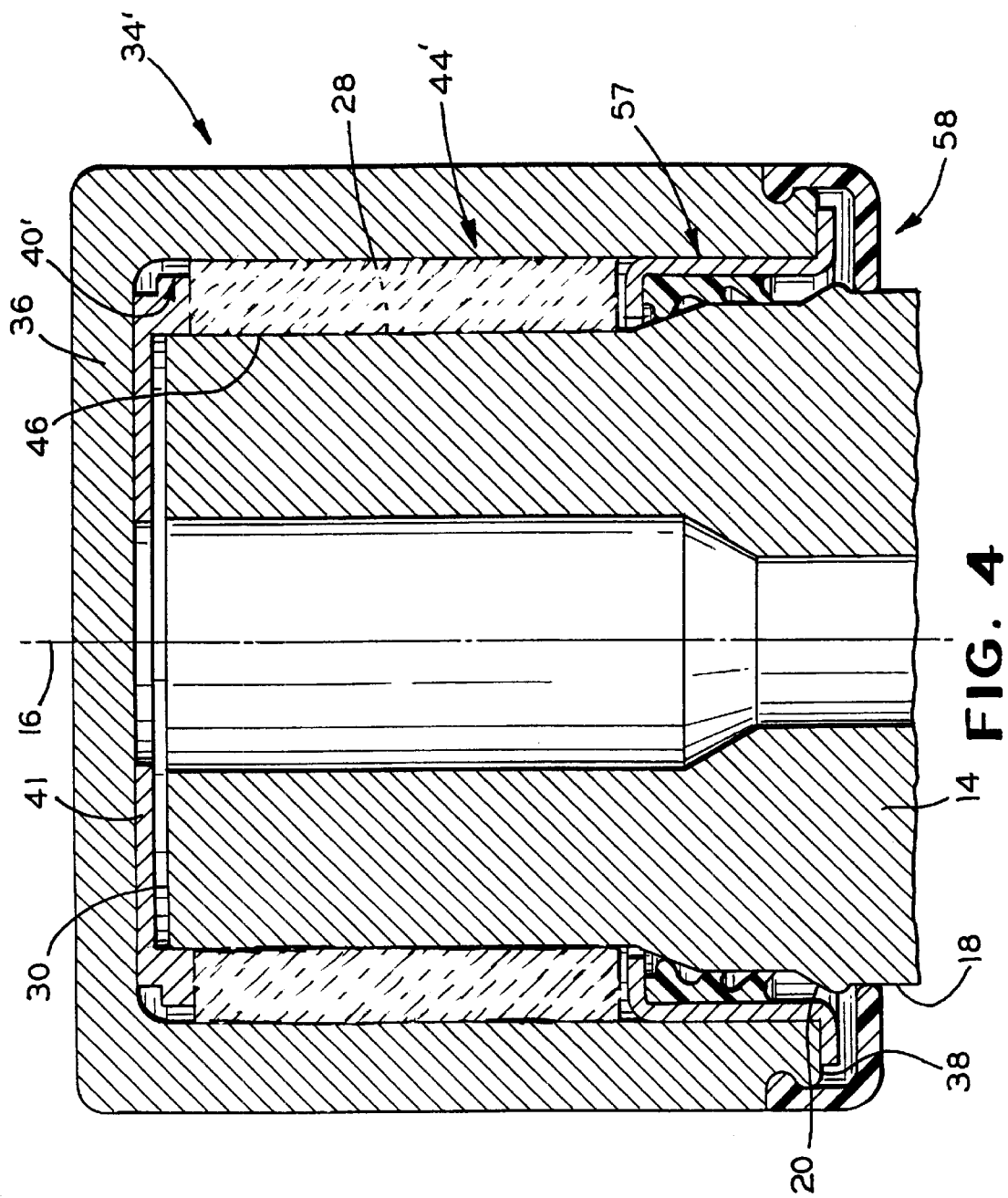
FIG. 4 is an enlarged sectional elevational view similar to FIG. 2 of a second embodiment of a cross assembly for a universal joint in accordance with this invention.

FIG. 4 illustrates a second embodiment of the invention that, in large measure, is similar to the first embodiment described above. In the second embodiment, however, a modified bearing cup 34' is provided. The modified bearing cup 34' does not have a recess 42 formed therein. Rather, a modified insert 44' is provided between a smooth, cylindrical inner surface 40' of the modified bearing cup 34' and the outer bearing surface 28 of the trunnion 14. The modified insert 44' may be secured in any conventional manner to either the smooth, cylindrical inner surface 40' of the modified bearing cup 34' or to the outer bearing surface 28 of the trunnion 14. Alternatively, the modified insert 44' may be secured to neither of the smooth, cylindrical inner surface 40' of the modified bearing cup 34' or the outer bearing surface 28 of the trunnion 14, but rather be retained therebetween.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A cross assembly for a universal joint comprising:
   a cross member including a trunnion having an outer surface;
   an annular insert formed from a ceramic material and disposed about said trunnion, said insert including an inner surface that engages said outer surface of said trunnion, said insert further including an outer surface; and
   a bearing cup disposed about said insert for rotation relative to said trunnion, said bearing cup including an inner surface that engages said outer surface of said insert.

2. The cross assembly defined in claim 1 wherein said cross member includes a plurality of trunnions having respective outer surfaces; and wherein an annular insert formed from a ceramic material is disposed about each of said trunnions, each of said inserts including an inner surface that engages said outer surface of said trunnion, each of said inserts further including an outer surface; and wherein a bearing cup is disposed about each of said inserts for rotation relative to each of said trunnions, each of said bearing cups including an inner surface that engages said outer surface of said insert.

3. The cross assembly defined in claim 1 wherein said inner surface of said insert is provided with a layer of a wear-resistant material.

4. The cross assembly defined in claim 1 wherein said outer surface of said trunnion is provided with a layer of a wear-resistant material.

5. The cross assembly defined in claim 1 wherein said inner surface of said insert is provided with a layer of a wear-resistant material, and wherein said outer surface of said trunnion is provided with a layer of a wear-resistant material.

6. The cross assembly defined in claim 1 wherein said inner surface of said bearing cup has a groove formed therein, and wherein said insert is disposed within said groove.

7. The cross assembly defined in claim 1 wherein said inner surface of said bearing cup is cylindrical, and wherein said insert engages said cylindrical inner surface of said bearing cup.

8. The cross assembly defined in claim 1 wherein said insert is formed from a ceramic material containing metal oxides.

9. The cross assembly defined in claim 1 wherein said insert is formed from a ceramic material containing inorganic, nonmetallic solids.

10. The cross assembly defined in claim 1 wherein said insert is formed from a ceramic material containing compounds of metallic elements and carbon, nitrogen, or sulfur.

11. A cross assembly for a universal joint comprising:
a cross member including a trunnion having an outer surface;
an annular insert formed from a semi-crystalline polyester material and disposed about said trunnion, said insert including an inner surface that engages said outer surface of said trunnion, said insert further including an outer surface; and
a bearing cup disposed about said insert for rotation relative to said trunnion, said bearing cup including an inner surface that engages said outer surface of said insert.

12. A method of manufacturing a cross assembly for a universal joint comprising the steps of:
(a) providing a cross member including a trunnion having an outer surface, an annular insert formed from a ceramic material and including an inner surface and an outer surface, and a bearing cup including an inner surface;
(b) disposing the annular insert about the trunnion such that the inner surface of the annular insert engages the outer surface of the trunnion; and
(c) disposing the bearing cup about the annular insert such that the inner surface of the bearing cup engages the outer surface of the annular insert.

13. The method defined in claim 12 wherein said step (a) is performed by providing a cross member including a plurality of trunnions having respective outer surfaces, a plurality of annular inserts formed from a ceramic material and including respective inner surfaces and outer surfaces, and a plurality of bearing cups including respective inner surfaces, and wherein said step (b) is performed by disposing the annular inserts about the trunnions such that the inner surfaces of the annular inserts engage the outer surface of the trunnions, and wherein said step (c) is performed by disposing the bearing cups about the inserts such that the inner surfaces of the bearing cups engage the outer surfaces of the annular inserts.

14. The method defined in claim 12 wherein said step (a) is performed by providing the inner surface of the insert with a layer of a wear-resistant material.

15. The method defined in claim 12 wherein said step (a) is performed by providing the outer surface of said trunnion is provided with a layer of a wear-resistant material.

16. The method defined in claim 12 wherein said step (a) is performed by providing the inner surface of the insert with a layer of a wear-resistant material and by providing the outer surface of the trunnion with a layer of a wear-resistant material.

17. The method defined in claim 12 wherein said step (a) is performed by providing the inner surface of the bearing cup with a groove, and wherein said step (c) is performed by disposing the insert within the groove.

18. The method defined in claim 12 wherein said step (a) is performed by providing a cylindrical inner surface on the bearing cup, and wherein said step (c) is performed by disposing the insert in engagement with the cylindrical inner surface of the bearing cup.

19. The method defined in claim 12 wherein said step (a) is performed by forming the insert from a ceramic material containing metal okides.

20. The method defined in claim 12 wherein said step (a) is performed by forming the insert from a ceramic material containing inorganic, nonmetallic solids.

21. The method defined in claim 12 wherein said step (a) is performed by forming the insert from a ceramic material containing compounds of metallic elements and carbon, nitrogen, or sulfur.

* * * * *